(12) United States Patent
Parkinson et al.

(10) Patent No.: US 12,151,443 B2
(45) Date of Patent: Nov. 26, 2024

(54) FABRICATION OF THREE-DIMENSIONAL STRUCTURES FROM PREFORM BLANKS

(71) Applicant: Cytec Industries Inc., Princeton, NJ (US)

(72) Inventors: Robert Parkinson, Wrexham (GB); Sebastien Luc Greber, Brynteg (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 341 days.

(21) Appl. No.: 17/432,820

(22) PCT Filed: Feb. 21, 2020

(86) PCT No.: PCT/US2020/019334
§ 371 (c)(1),
(2) Date: Aug. 20, 2021

(87) PCT Pub. No.: WO2020/172608
PCT Pub. Date: Aug. 27, 2020

(65) Prior Publication Data
US 2022/0118718 A1    Apr. 21, 2022

Related U.S. Application Data

(60) Provisional application No. 62/808,979, filed on Feb. 22, 2019.

(51) Int. Cl.
| | |
|---|---|
| *B29C 70/38* | (2006.01) |
| *B29B 11/16* | (2006.01) |
| *B29C 70/20* | (2006.01) |
| *B29C 70/44* | (2006.01) |
| *B29C 70/54* | (2006.01) |
| *B29D 99/00* | (2010.01) |

(Continued)

(52) U.S. Cl.
CPC ............ *B29C 70/386* (2013.01); *B29B 11/16* (2013.01); *B29C 70/205* (2013.01); *B29C 70/44* (2013.01); *B29C 70/549* (2021.05); *B29D 99/0003* (2013.01); *B29K 2101/10* (2013.01); *B29L 2031/3085* (2013.01)

(58) Field of Classification Search
CPC ... B29C 70/386; B29C 70/205; B29C 70/549; B29B 11/16
See application file for complete search history.

(56) References Cited

U.S. PATENT DOCUMENTS

| | | | | |
|---|---|---|---|---|
| 2009/0091052 A1* | 4/2009 | Pridie | ..................... | B29C 70/54 |
| | | | | 425/149 |
| 2014/0175709 A1* | 6/2014 | Blackburn | .............. | B29B 11/16 |
| | | | | 264/554 |
| 2015/0375461 A1 | 12/2015 | Blackburn et al. | | |

FOREIGN PATENT DOCUMENTS

| | | | | |
|---|---|---|---|---|
| DE | 202017102169 U1 * | 7/2017 | ............. | B29C 70/30 |

* cited by examiner

*Primary Examiner* — Farah Taufiq
(74) *Attorney, Agent, or Firm* — Thi Dang (57) ABSTRACT

A method for producing a three-dimensional preform from an intermediate preform blank (30, 70), which contain undulations (31) in a portion thereof. The preform blank (30, 79) may be formed on a tool surface (60) containing undulations (61) using an automated placement method such as Automated Tape Laying (ATL) or Automated Fiber Placement (AFP), in which narrow-width strips of material are dispensed side-by-side. Various preform blanks (30, 70) and molding tools (10, 50, 80) have been designed to produce shaped preforms having generally C-shape and Z-shape cross-sections.

9 Claims, 9 Drawing Sheets

(51) Int. Cl.
*B29K 101/10* (2006.01)
*B29L 31/30* (2006.01)

FIG.1

FIG.2 wrinkles

FABRICATION OF THREE-DIMENSIONAL STRUCTURES FROM PREFORM BLANKS

CROSS-REFERENCE TO RELATED APPLICATIONS

The instant application is a U.S. national phase entry under 35 U.S.C. § 371 of International Application No. PCT/US2020/019334 filed on Feb. 21, 2020, which claims the benefit of prior U.S. Provisional Application No. 62/808,979 filed on Feb. 22, 2019, the content of each of these prior filed applications is incorporated herein by reference in its entirety.

The present disclosure relates generally to the manufacturing of fiber-reinforced composite parts.

DETAILED DESCRIPTION

Fiber-reinforced composite materials have been used to fabricate structural parts in the aerospace and automotive industries. These composite materials contain reinforcement fibers embedded in a polymer matrix. Their light-weight property is particularly advantageous when compared to similar parts constructed from metals. Three-dimensional composite parts can be manufactured using different methods. Traditionally, composite parts are made from prepregs, which are composed continuous reinforcement fibers impregnated with a curable matrix resin, such as epoxy. The resin content in the prepreg is relatively high, typically 20%-50% by weight. Multiple plies of prepreg may be cut to size for laying up, then subsequently assembled and shaped on a molding tool. In the case where the prepreg cannot be easily adapted to the shape of the molding tool, heating may be applied to the prepregs in order to gradually deform it to the shape of the molding surface.

Another method for fabricating a composite structure is by liquid resin infusion. Resin Transfer Molding (RTM) and Vacuum Assisted Resin Transfer Molding (VARTM) are examples of manufacturing processes that involve injecting or infusing a liquid resin into a fibrous preform. The fibrous preform is porous enough to allow the resin to infuse or impregnate it completely during the resin infusion operation. Exemplary applications of such methods include aircraft wing skins and fuselages.

During the RTM process, the fibrous preform is placed into an enclosed mold cavity, and the resin is injected into the cavity under pressure. The mold with the preform is often put under vacuum so that the vacuum removes all the air in the preform reducing porosity and speeds up the RTM process. Once the liquid resin fills the mold cavity, the resin is cured, resulting in the formation of a composite part. VARTM is similar to RTM except that a single-sided tool is normally used with vacuum bagging, and vacuum pulls the liquid resin into the preform. These techniques are well suited for the manufacturing of structural parts with very complex shapes.

To form a 3-dimensional (3D) composite part, mechanical or vacuum diaphragm forming with or without the application of heat can be used. Generally, such forming method includes transforming a flat preform blank into a desired 3D shape on a molding tool using heat and pressure. The flat preform blank is composed of 2 or more layers of prepreg plies or fibrous materials.

Figure 1:
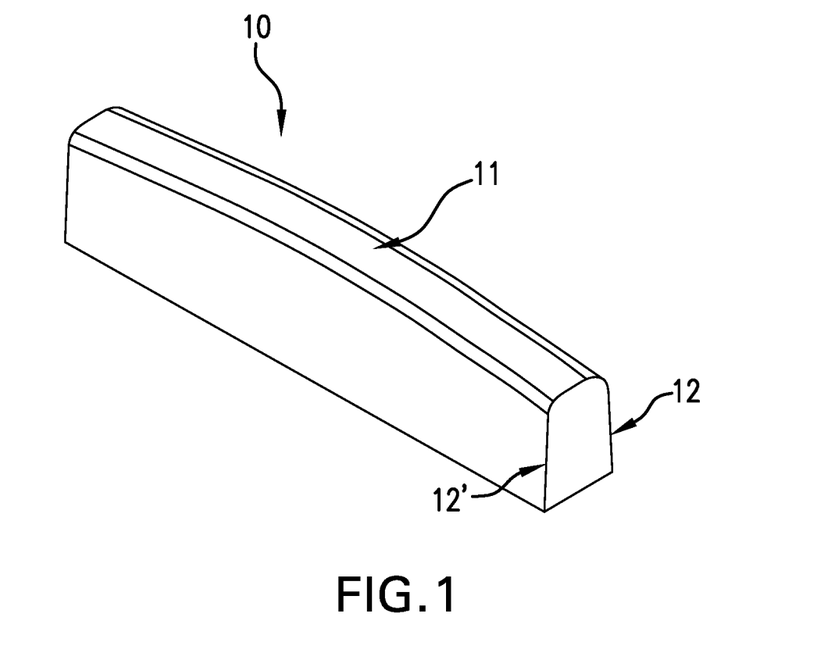
FIG. 1 shows a three-dimensional (3D) molding tool for forming a section of wing spar having a curved surface.
Figure 2:
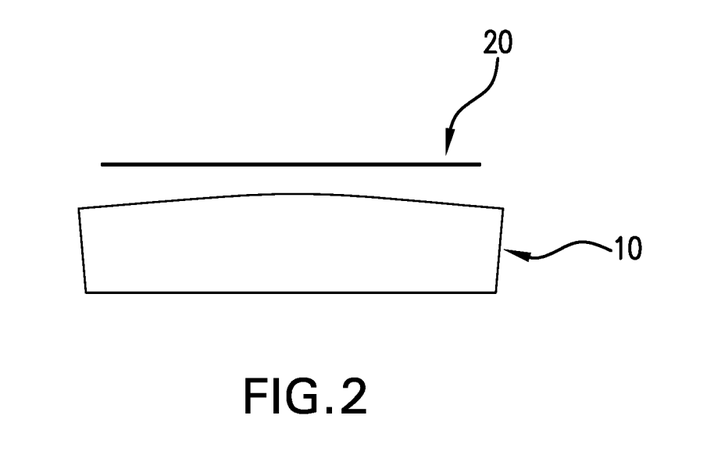
FIG. 2 shows the cross-section view profile of the molding tool below a flat preform blank.
Figure 3:
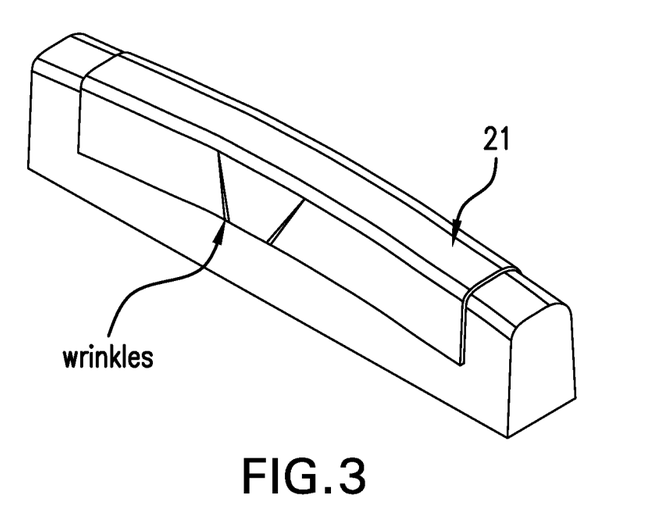
FIG. 3 shows a preform with wrinkles as result of forming on the molding tool of FIG. 1.

The forming of 3D structures having non-planar or curved surfaces and flanges such as aircraft wing spars from a flat preform blank is problematic because forming a flat blank around two intersection curvatures on a molding tool often causes wrinkles in the final structure. For illustration, FIG. 1 shows an exemplary molding tool 10 suitable for forming a rear wing spar section. The tool 10 has a longitudinal length, a curved convex top surface 11 extending along the length and two contiguous sidewalls 12, 12'. The sidewalls are planar or substantially planar. FIG. 2 shows a cross-section view of the tool 10 and a flat preform blank 20 over the top curved surface of the tool. When the flat perform blank is made to conform to the tool surfaces, wrinkles are formed in the flanges of the shaped preform 21 as shown in FIG. 3.

It is also problematic if the 3D preform is made by automated placement of prepreg tapes or fibers tapes directly onto the tool surface shown in FIG. 1. The robotic placement head would need to slow down when it lays down the tapes at the round corners, and the tapes at such corners may not be fully compacted, often resulting in bulky corners.

Figure 4:
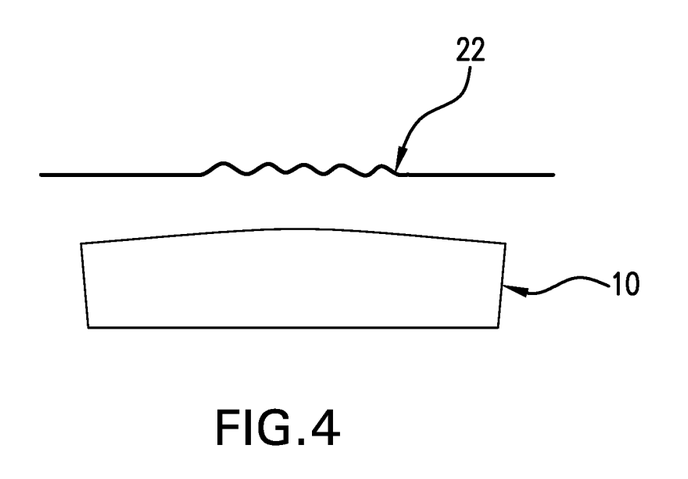
FIG. 4 shows the cross-section view profile of a molding tool below a preform blank having undulations/ripples.

A solution for preventing wrinkles in shaped preforms with curvatures is provided herein. To that end, a substantially flattened preform blank has been designed so that it has the necessary length and surface area to conform to the desired contours of the molding tool without wrinkling. As illustrated in FIG. 4, the preform blank 22 is mostly flat but for undulations (or ripples) at a middle section (between flat end portions) that corresponds to the curved surface area of the molding tool below.

Figure 5:
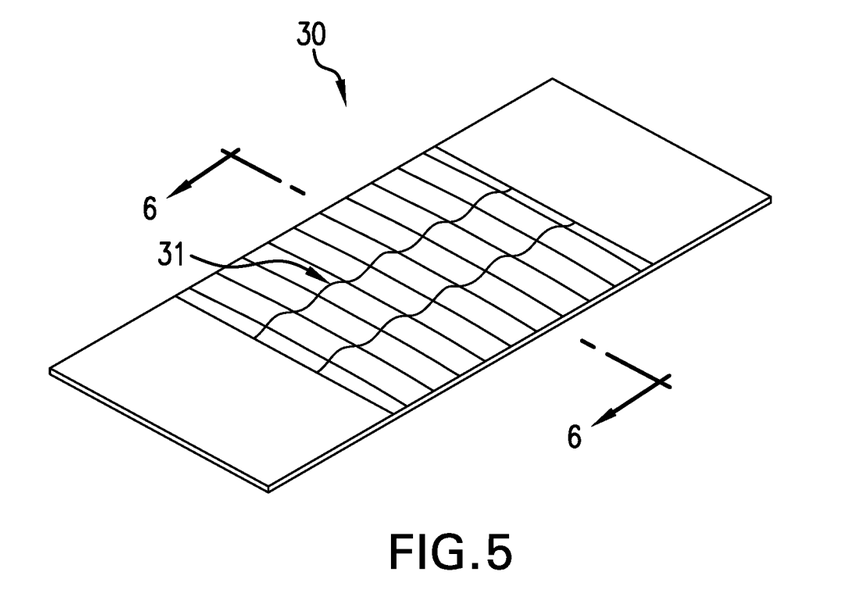
FIG. 5 shows a perspective view of the preform blank containing undulations/ripples that are designed to prevent wrinkles during forming.
Figure 6:
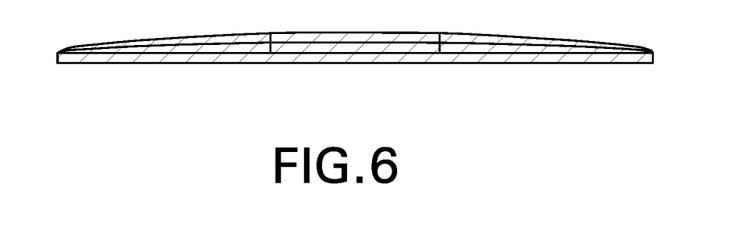
FIG. 6 shows a profile view of the undulations in the preform blank shown in FIG. 5.

FIG. 5 shows, as an example, the perspective view of a preform blank 30 with undulations 31 in a middle section. The undulations are defined by ridges and valleys, and the ridges are oriented in a direction orthogonal to the longitudinal side edges of the preform blank 30. The undulations create the extra material along the length of the preform blank that is sufficient for conforming to the curved contours of the molding tool without wrinkling. FIG. 6 shows a cross-sectional view of the undulations if a cross-sectional cut is made through the center of the preform blank shown in FIG. 5 such that the cut is through a valley between two ridges. As shown in FIG. 6, the ridges in the undulations taper in height from the center of the preform blank to the side edges of the blank.

Figure 7:
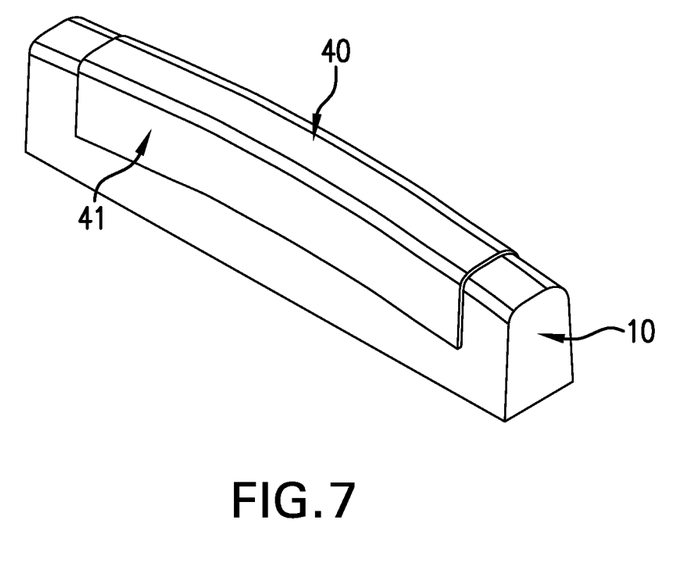
FIG. 7 shows a preform being shaped on the molding tool of FIG. 1 without wrinkles.

When the preform blank with undulations is formed onto the tool 10 as shown in FIG. 7, the undulations in the preform blank flatten out and the resulting shaped preform 40 has a smooth curved surface and flange portions 41 without wrinkles. The shaped preform 40 in FIG. 7 has a generally C-shaped cross-section. Such configuration is suitable for a wing rear spar section of an aircraft.

The location of the undulations in the preform blank and the area occupied by the undulations are determined by the geometry of the final part, particularly, the curved contours, round corners and bent portions of the final parts. The undulations provide extra material where needed.

It should be noted that the relative dimensions shown in the figures are not to scale. For example, the longitudinal length of the tool 10 as shown in FIGS. 1 and 7 can be as much as 100 times the distance between the sidewalls. Similarly for the shaped preform 40 shown in FIG. 7, length of the preform may be up to 100 times the distance between the side flanges. There is no restriction on the length of the preform. Such length depends on the composite part being made. In some embodiments, the length may be in the range of 5 m to 40 m. Each flange portion extends orthogonally from the curved convex surface of the shaped preform. It should be understood that the flange may form an angle other than 90° with the curved convex surface.

According to one embodiment, the preform blank with undulations is formed by an automated placement method such as Automated Tape Laying (ATL) or Automated Fiber Placement (AFP), in which narrow-width strips of material are dispensed side-by-side. In another embodiment, the preform blank is formed of broad pieces of fibrous materials, often referred to as "broad goods". Broad goods include woven fabrics, non-crimped fabrics, multi-axial fabrics and the like.

Figure 8:
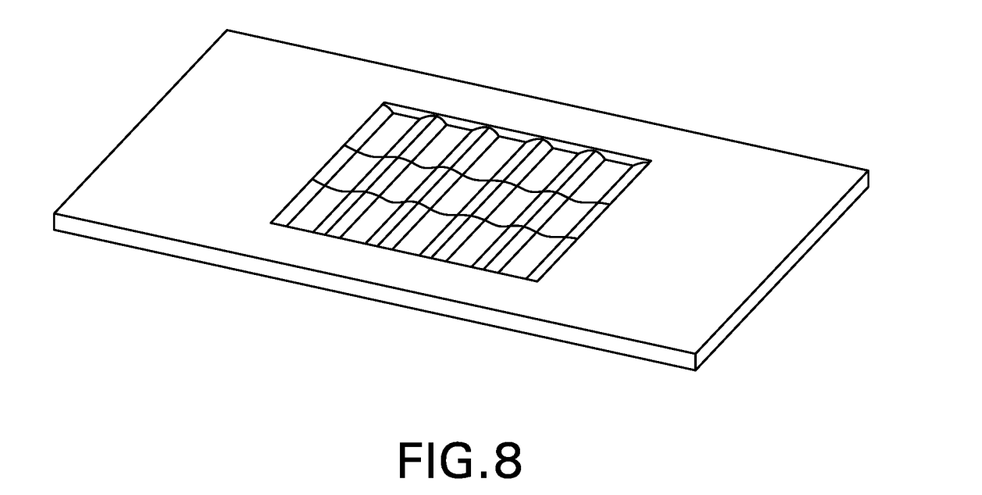
FIG. 8 shows an exemplary tool for forming undulations/ripples in a preform blank.

FIG. 8 shows an exemplary tool for forming the preform blank with undulations shown in FIG. 5. The tool has a mold surface that is mostly planar or has gentle curves but for undulations at the center corresponding to where extra material is needed. In addition, there is a flat border around the area for the blank. This border area is needed for roll in/roll out of an AFP/ATL roller, e.g. when laying 45° plies and to lay minimum course length. The roll in/roll out and minimum course length is ATL/AFP machine dependent. For example, the border may be 100 mm in width.

The preform blank may be formed by an ATL/AFP process, in which a plurality of continuous, narrow-width fiber tapes or prepreg tapes are deposited side-by-side via automated placement mechanism and compacted onto the mold surface of the tool shown in FIG. 8 so as to form a ply with the desired dimensions (e.g., length and width). The ply conforms to the contours of the mold surface including the undulations. One or more subsequent plies of fiber tapes or prepreg tapes may be deposited onto the first layer in the same manner until a preform blank of desired thickness is obtained. Instead of narrow-width fiber tapes, broad goods or larger pieces of fabric may be used to build up a fibrous preform blank on the mold surface. The pieces of fabric can be pressed into the undulations of the tool using one or more compaction roller(s).

Thinner layups ("sub-preforms") may be formed separately on the tool surface and then combined in a stack to obtain the total thickness desired for the preform blank. Such sub-preforms are desirable for building up a very thick layup because the undulations would lose their definition as the layup increases in thickness on the tool surface.

The molding or shaping of the blank preform on the molding tool may be carried out by thermoforming, which includes the application of heat and pressure. Thermoforming includes hot drape forming, whereby the preform blank is enclosed by a flexible diaphragm or between two flexible diaphragms, and vacuuming is applied to cause the preform blank to conform onto the mold surface. An example of such thermoforming process is described in U.S. Pat. No. 9,259,859.

Figure 9A:
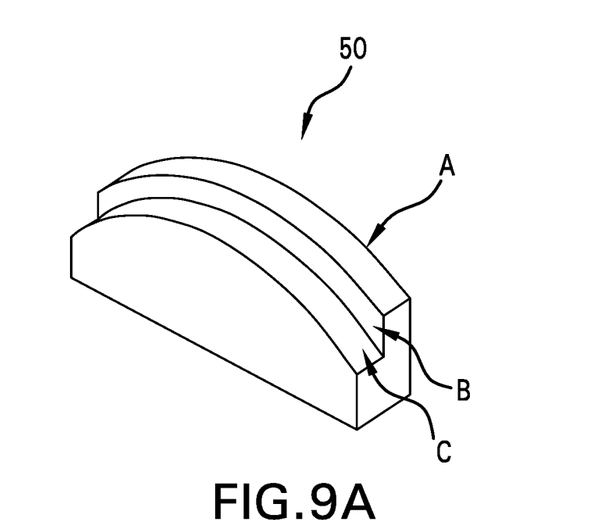
FIG. 9A shows a perspective view of a molding tool for forming a structure with a step profile according to another embodiment.
Figure 9B:
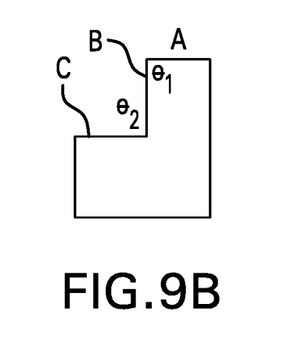
FIG. 9B is cross-section view of the molding tool shown in FIG. 9A.

FIG. 9A is an exemplary molding tool 50 for shaping a preform blank into a final preform with a step profile or generally Z profile. The tool 50 has a curved convex surface A, a surface B forming an angle $\theta_1$ (FIG. 9B) and contiguous with surface A, and a convex curved surface C forming an angle $\theta_2$ (FIG. 9B) with surface B. Surfaces A, B and C together form a step profile. Although angles $\theta_1$ and $\theta_2$ are shown in FIGS. 9A and 9B to be 90°, they may vary between 0° and 180°, for example, from 10° to 170°, or 60° to 130°, or 80° to 100°. As shown in FIG. 9A, surface C of the molding tool is a convex curved surface with a curvature concentric to that of the curved surface A.

Figure 10:
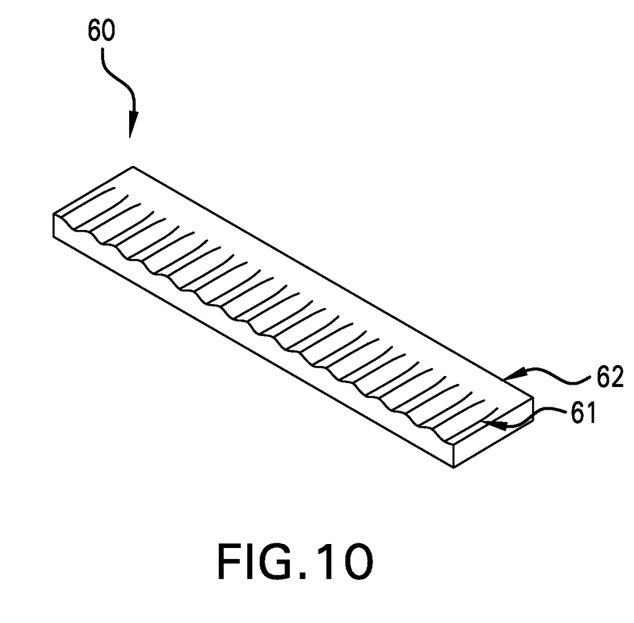
FIG. 10 shows a tool for forming a preform blank that can be used on the molding tool of FIG. 9A.

FIG. 10 illustrates another embodiment of a tool 60 for forming a preform blank with undulations that can be shaped onto the molding tool 50 of FIG. 9A without causing wrinkles. For simplicity, this tool is shown without the roll in/out border areas. Tool 60 has a mold surface with an undulating portion 61 along the length of the tool and a non-undulating or flat portion 62 adjacent to the undulating portion 61. The undulating surface 61 is formed of alternating peaks and valleys and has a wavy edge.

Shaping a thick preform blank of four or more plies on a tool surface with curvatures and corners such as that shown in FIG. 9A is problematic. Higher number of plies in a layup increases the likelihood of wrinkles because multiple plies formed around an angle will have to slip relative to each other and the thicker the stack the more the top plies have to slip relative bottom ones. A thermoforming method is disclosed herein to overcome the issue associated with thicker layup.

Figure 11:
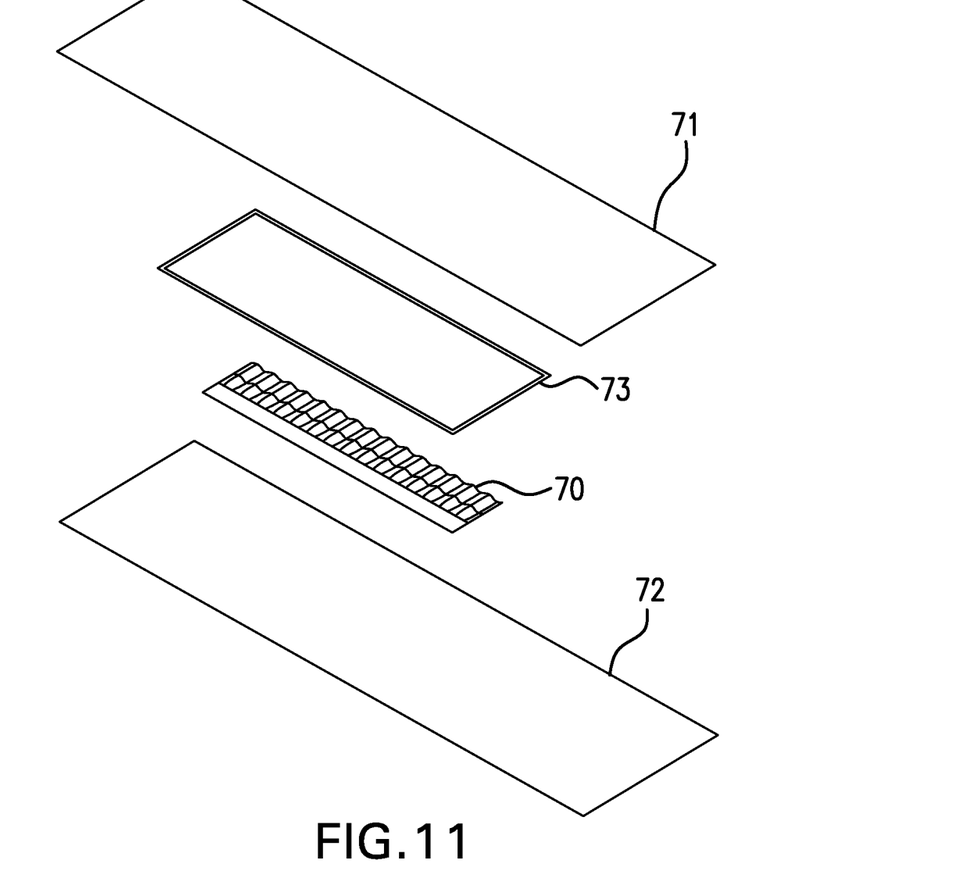
FIG. 11 shows the components for enclosing a preform blank between two diaphragms.
Figure 12:
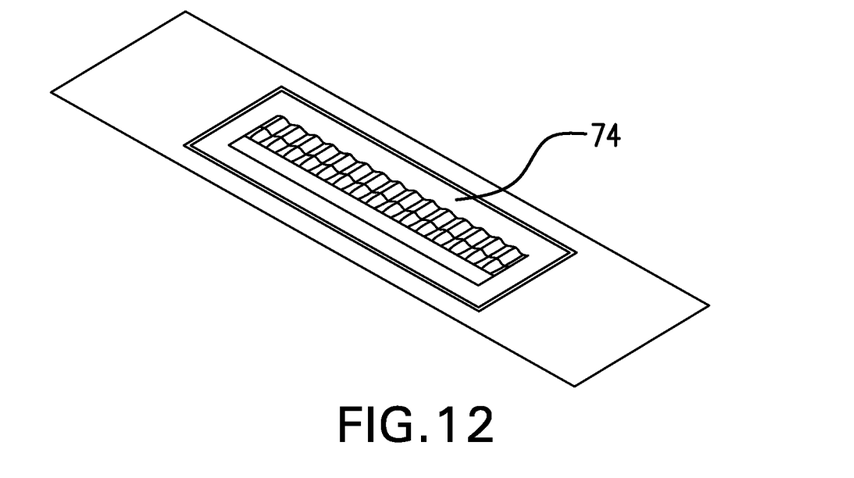
FIG. 12 shows an enclosed preform blank ready for thermoforming.
Figure 13:
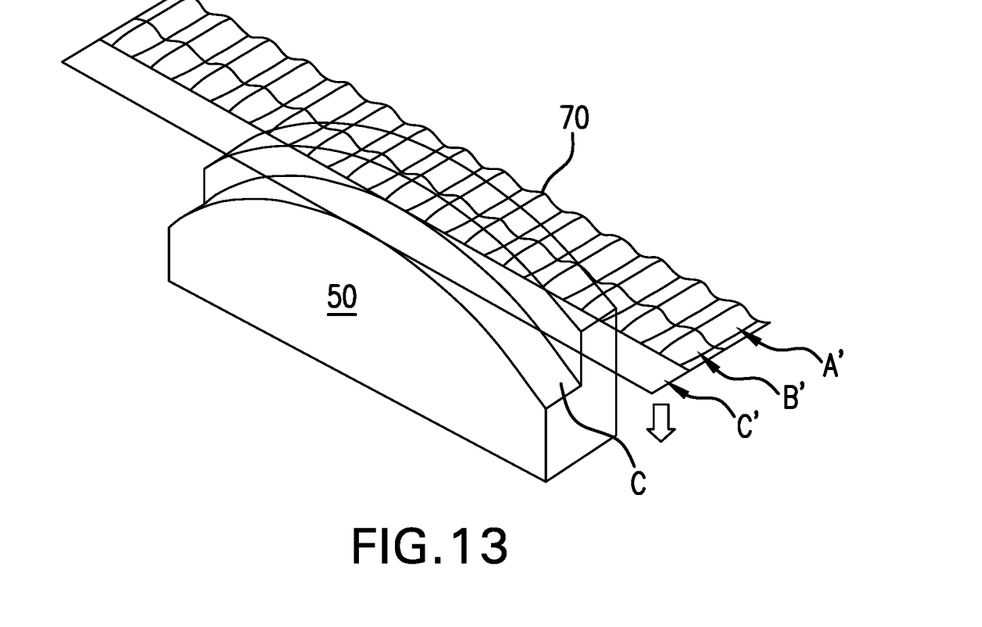
FIG. 13 illustrates how a preform blank is applied over the molding tool of FIG. 9A.

FIGS. 11-13 illustrate a thermoforming method for shaping a preform blank on the tool 50 of FIG. 9A. Referring to FIG. 11, a preform blank 70 with undulations is placed between two flexible diaphragms 71, 72, which may be made of a thermoplastic polymer, e.g. polyamide or nylon, or an elastic material, e.g., rubber. A sealant tape 73 is provided between the flexible diaphragms 71, 72 so as to define a sealed enclosure 74 surrounding the preform blank 70 as shown in FIG. 12. The enclosure 74 is connected to a vacuum source (not shown) via a vacuum port (not shown), which is formed in one of the flexible diaphragms that define the enclosure. Initially, air is partially removed from the enclosure 74 to create a slight vacuum, for example, 50-300 mbar. The preform blank 70 is formed by laying up a plurality of fibrous materials or prepreg plies on the tool 60 of FIG. 10. The preform blank 70 may be a stack of sub-preforms, each sub-preform being formed on the tool 60 shown in FIG. 10 or similar tools that allow for the change in path length due to thickness of a preform going around a corner.

The assembly shown in FIG. 12 serves two purposes: to hold the layers of the preform blank loosely together during heating, and to manipulate the preform blank so it will change its shape.

Figure 14:
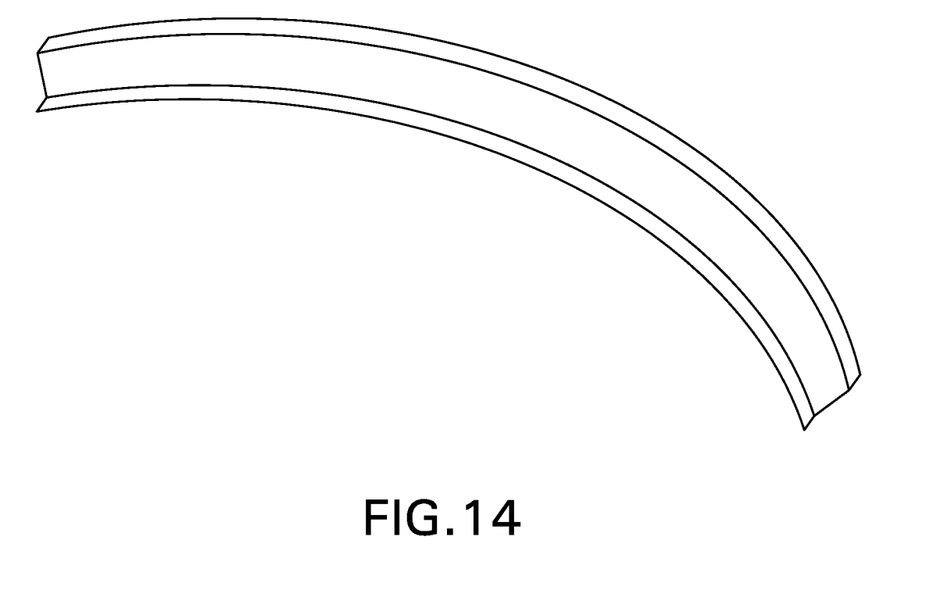
FIG. 14 shows the resulting shaped preform derived from the molding method shown in FIG. 13.

Next, heat is applied to the enclosed preform blank being held under slight vacuum so as to lower the viscosity of the binder or resin in the preform blank. Referring to FIG. 13, the heated preform blank 70 (enclosed by diaphragms, which are omitted for simplicity) is draped over the tool 50 such that undulating portions A' and B' of the preform blank conform to the surfaces A and B of tool 50, respectively. The diaphragms containing the preform blank is pulled toward the molding tool 50, causing the undulations in the preform blank to flatten out over the tool's curved surface A first. As tension continues to be applied over the diaphragms, the undulating portion B' of the preform blank flatten out over the tool's surface B, and the flat portion C' of the preform blank conforms to the surface C of tool 60. As the undulations in the preform blank flatten out, the length of portion A' becomes longer than the portion C' because the two surfaces are linked and have different lengths, they start to curve. After the preform blank has conformed to the tool 50, the shaped preform is cooled under vacuum to set the shape. The resulting preform shown in FIG. 14 is a curved structure having a cross section with a step profile. The cross-section of this type of structure is referred to as a generally Z shape cross-section.

Figure 15:
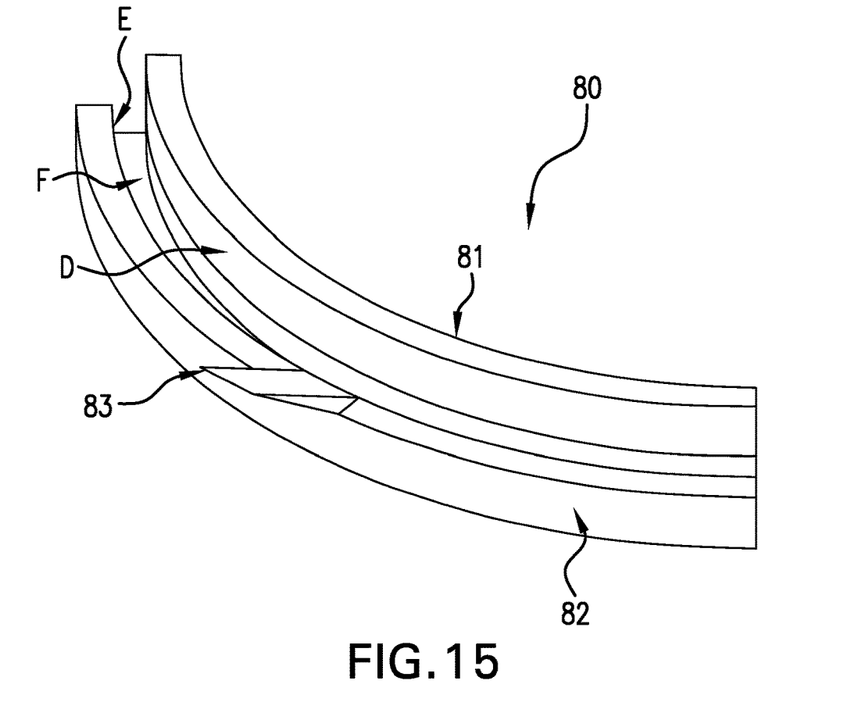
FIG. 15 shows a molding tool for forming a structure with a generally C-shape cross-section.
Figure 16:
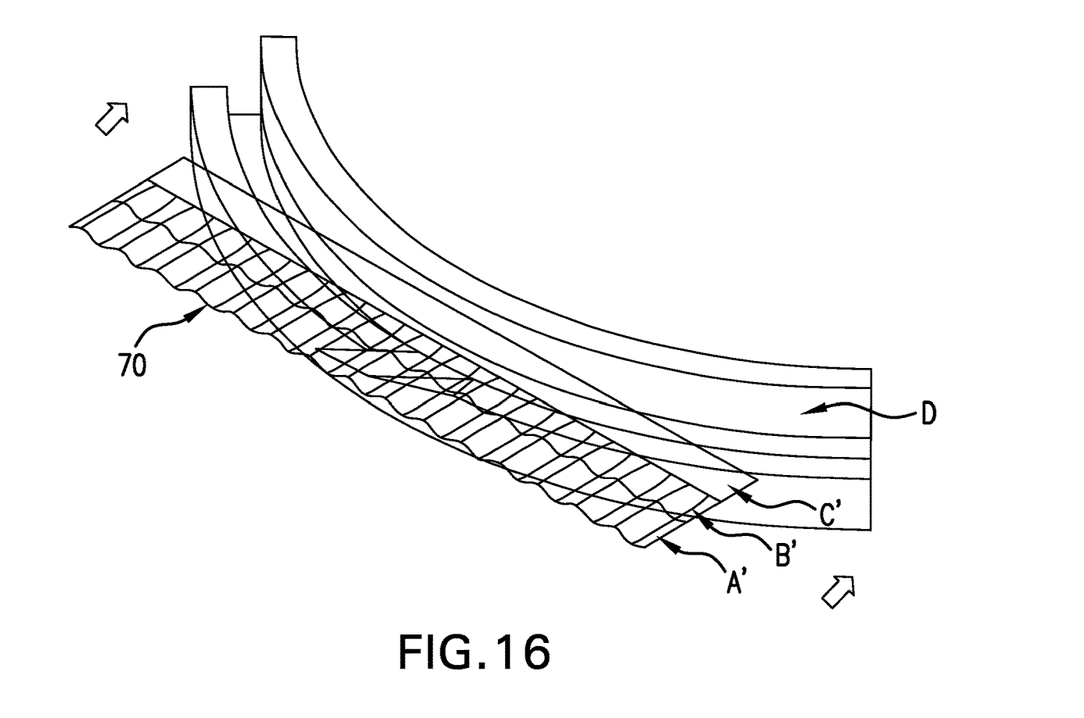
FIG. 16 illustrates how a preform blank is applied over the molding tool of FIG. 15.

In another embodiment, the preform blank 70 shown in FIG. 12 can be shaped into a structure with a generally C shape cross-section using an exemplary molding tool 80 shown in FIG. 15. Referring to FIG. 15, the molding tool 80 has two concentric sidewalls 81, 82 and a cavity defined by a first inner curved surface D, a second inner curved surface E and a bottom surface F. The tool 80 further includes a raised short edge 83 attached to the sidewall 82 so that it is above and extending away from the cavity. The preform blank 70 is enclosed between two diaphragms as described in reference to FIG. 12 and heated. The enclosed preform blank is then placed over the cavity of molding tool 80 as shown in FIG. 16. The enclosed preform blank 70 is lowered until the diaphragm below the undulating portion A' of the preform blank is in contact the short raised edge 83 of tool 80 and the flat portion C' of the preform blank is near the middle of the inner curved surface D of the tool.

Figure 17:
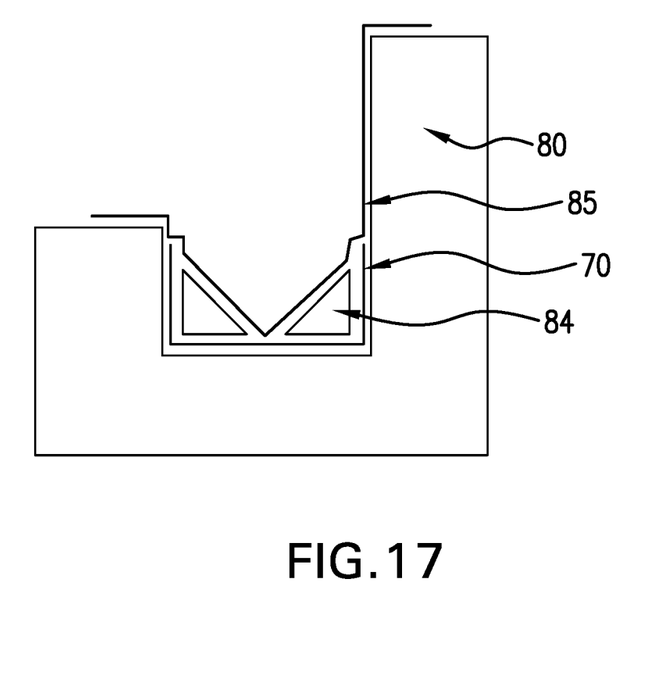
FIG. 17 shows the location of pressure intensifiers during the shaping of the preform blank using the molding tool of FIG. 15.

The diaphragms are then pulled lengthwise, towards the inner curved surface D of the tool and then down. As before, tension causes the undulations in the preform blank to flatten and conform to the inner curved surface E and bottom surface F of tool 80. Friction will prevent the edge of the flat portion C' from moving as the flat portion C' conforms to the inner curved surface D, and the raised short edge 83 also forces the undulating portion A' to form upwards. Once all undulations have been flattened, the preform assumes the shape corresponding to the tool's cavity. Pressure intensifiers 84 shown in FIG. 17 can be placed in the corners of the preform being held in tool 80 before further vacuuming is applied to complete the forming process. Pressure intensifiers are inserts with triangular cross-section configured to mate with (fit into) the corners, and are used to push the preform material into the corners of the tool. Further vacuuming is applied to the entire assembly (preform and tool) by enclosing the assembly under a flexible diaphragm 85 shown in FIG. 17 and applying vacuum to the enclosed space such that the diaphragm 85 contacts the intensifiers 84 before significant pressure is applied to the preform 70 against the sidewall straight surfaces and bottom surface of the tool.

Figure 18:
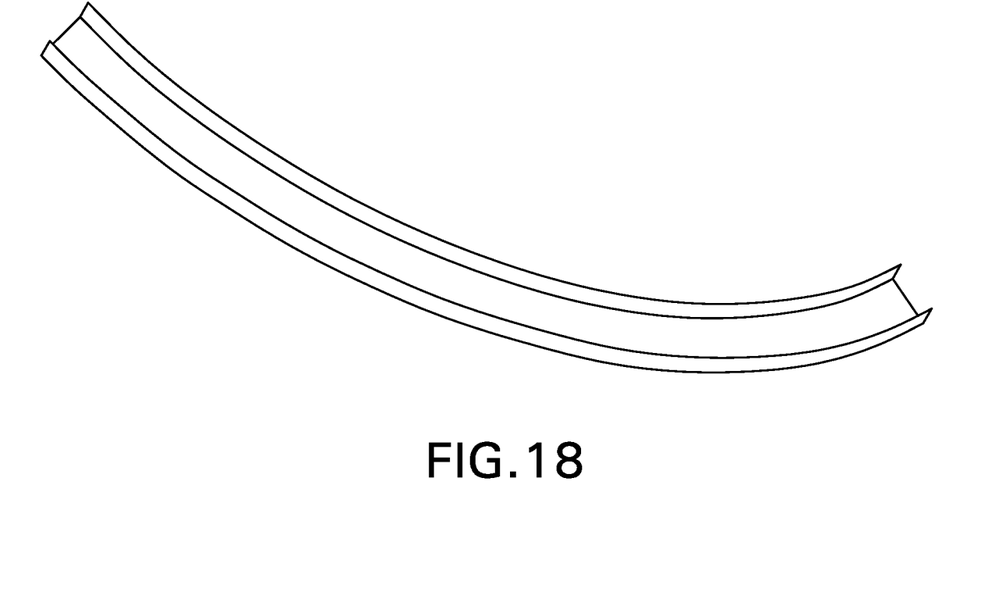
FIG. 18 shows the resulting shaped preform derived from the molding method shown in FIG. 16.

The resulting shaped preform shown in FIG. 18 is a curved structure with a generally C-shape cross-section.

It should be understood that the preforms and tools in FIGS. 8-18 are not drawn to scale and can vary depending on the desired dimensions for the final composite part.

If the shaped preform is formed of fiber tapes or broad goods, such preform may be configured for receiving liquid resin via RTM or VARTM processes. The preform is trimmed to fit in the RTM tool. The preform is heated under vacuum inside the tool to a temperature suitable for the resin's viscosity, reactivity and pot life. The resin is injected into the tool under pressure. The tool is heated at a rate to a temperature for a time appropriate for the resin to cure to the desired properties. Once cured, the resin-infused preform is cooled and removed from the tool, resulting in a composite part. The composite part is then trimmed, optionally drilled, and finished (e.g., painted/abraided to receive adhesive) as desired by the manufacturer. The process for VARTM is similar except the tool is open one side, so a conformable vacuum bag is applied to this side of the tool. RTM and VARTM tools may have integrated heaters or they can be heated inside an oven or an autoclave.

If the shaped preform is formed of prepreg tapes, then such preform is in its final shape but uncured. Thus, after the preform blank is shaped on the molding tool, the shaped preform is cured to form a hardened composite structure.

If the shaped preform is formed of thermoplastic composite material, then such a preform requires heating during shaping and cooling afterwards.

Automated Placement

An automated placement method such as Automated Tape Laying (ATL) or Automated Fiber Placement (AFP) may be used to build up, layer by layer, the preform blank with undulations disclosed herein. The ATL/AFP process involves automatically dispensing a plurality of narrow-width strips of fibrous material ("fiber tapes") or prepreg tapes, side by side, onto a tool surface to create a layer of large dimensions, referred to as a "ply". Additional plies are sequentially built onto the previously disposed ply to produce a layup with a desired thickness. The fiber tapes are porous and composed mostly of fibers while the prepreg tapes are not porous and are impregnated with a high amount of resin.

In a typical ATL/AFP operation, a placement head makes repeated passages over a tool surface to lay down multiple fiber/prepreg/thermoplastic tapes, side by side, in a defined pattern until a first ply of desired dimensions is formed. During each passage, the fiber placement head dispenses (or deposits) one or more continuous tapes from the supply creel(s) onto the tool surface while the placement head moves relative to the tool surface. The length of the continuous fiber/prepreg tape(s) is/are cut at the end of each passage. During the formation of the first ply, a compaction roller presses the tapes against the tool surface. Subsequent plies of fiber tapes are built up, layer by layer, by continued passages of the placement head over the prior laid ply. The compaction roller presses the subsequently laid tapes against the previously laid tapes to compact, i.e. consolidate, the superimposed tapes. The compaction roller may comprise a cylindrical body made of a flexible material, which is elastically deformable by compression. For example, the cylindrical body may be composed of a non-expanded or expanded elastomeric material, such as silicone, polysiloxane or polyurethane.

Each ply of fibrous material may be composed of parallel fiber tapes of unidirectional fibers. Similarly, each ply of prepreg may be composed of prepreg tapes with unidirectional fibers. In a preform blank, the unidirectional fibers in each fiber/prepreg ply may be oriented at a selected angle θ, such as 0°, 45°, or 90°, with respect to the length of the preform blank. The unidirectional fibers in each ply may be oriented at a different angle relative to the adjacent ply or plies depending on the structural properties desired for the final composite part. The preform blank may be formed according to a quasi isotropic layup, for example, [+45°/0°/−45°/90°]2 s or a directed layup, for example, [+45°/0°/0°/−45°/0°/0°/+45°/0°/−45°/90°]5 s.

Fiber Tapes

The fiber tapes for use in the automated placement method described above have a continuous length and a narrow width, for example, the width may be ⅛ in to 1.5 in (or 3.17 mm-38.1 mm), particularly, ¼ in to ½ in (or 6.35 mm-12.77 mm), which is typical for AFP. The fiber tapes may have a wider width, for example, 6 in to 12 in (or 152 mm-305 mm), which is typical for ATL.

Unlike conventional pre-impregnated tape (or prepreg), the fiber tape for forming the preform is substantially resin-free except for a small amount of binder, which is sufficient to hold the fibers together. The total content of binder in the fiber tape may be about 15% or less by weight, for example, between 0.1 and 15% by weight, based on the total weight of the fiber tape. The fibers constitute the major component of the fiber tape or fabric ply, e.g. greater than 80% by weight based on the total weight of the fiber tape.

In one embodiment, the fiber tape is composed of a layer of unidirectional fibers laminated to a nonwoven veil at least on one side. "Unidirectional" fibers refer to fibers aligning parallel to each other in the same direction. The unidirectional fibers are high-strength reinforcement fibers such as carbon fibers, graphite fibers, glass fibers, ceramic fibers, and aramid fibers. The nonwoven veil may comprise thermoplastic fibers, carbon fibers, or a combination thereof. The fibers of the veil may be randomly oriented or not depending on the veil manufacturing process conditions. In some embodiments, the areal weight of the nonwoven veil is 10 gsm or less. Alternatively, the nonwoven veil may be in the form of a thermoplastic grid or a porous, thermoplastic membrane with a controlled pattern of apertures. The openness of the nonwoven veil (whether in the form of random fibers, grid or porous membrane) is important to ease air removal and resin flow during the resin infusion process. When the thermoplastic veil is used, it also functions as a binder for holding the unidirectional fibers in place and will soften by heating during the automated placement method disclosed herein.

In one embodiment, the fiber tape is composed of a nonwoven carbon veil laminated to one side of a layer of unidirectional carbon fibers, and contains a binder composition in an amount sufficient for holding the veil and unidirectional fibers in place.

For embodiments in which the nonwoven carbon veil(s) is/are laminated to the unidirectional fibers, a binder, particularly a liquid binder, can be applied during the fabrication of the fiber tape to enhance the cohesiveness of the reinforcement structure. Moreover, during the fabrication of the fiber tape, a binder can be applied to enhance the bonding of the veil(s) to the unidirectional fibers. The binder(s) in the fiber tape may be selected from the binder materials discussed above for the binder applied onto the disposable layer. If the nonwoven veil(s) is a sheet or randomly arranged fibers, such veil contains a small amount of binder that was added during the manufacturing of the veil. Examples of binders that may be present in the veil include poly vinyl alcohol (PVA), polyester, cross-linked polyester, polystyrene, acrylic, polyphenol, polyurethane, and their copolymers and combinations thereof.

Additional details for the fabrication of fiber tapes comprising nonwoven veils laminated to unidirectional fibers, including the types of binders used during fabrication, may be found in the published application US 2015/375461 with the publication date of Dec. 31, 2015.

Prepreg Tapes

The substantially flattened preform blank with undulations disclosed herein can be fabricated using elongated or continuous prepreg tapes. Each prepreg tape is a strip of composite material composed of reinforcement fibers impregnated with a resin or polymeric material. The reinforcement fibers may be unidirectional carbon fibers impregnated with a thermosetting resin composition that will harden upon curing or embedded within a thermoplastic matrix that can be moulded with heat into the desired shape. The term "unidirectional" refers to alignment in one direction.

What is claimed is:

1. A method for producing a three-dimensional preform having a generally C-shape cross-section, said method comprising:
   (a) laying up four or more layers of fiber-containing material on a tool surface to form a preform blank having an undulating portion and a non-undulating or flat portion adjacent to the undulating portion, said undulating portion comprising a wavy edge and a plurality of undulations along said wavy edge, and said tool surface comprising undulations corresponding to the undulating portion of the preform blank;
   (b) providing a molding tool having a cavity defined by a first inner curved surface D, a second inner curved surface E, and a bottom surface F between surfaces D and E;
   (c) enclosing the preform blank between two flexible diaphragms;
   (d) heating the preform blank; and
   (e) shaping the enclosed preform blank in the cavity of the molding tool by applying tension to the diaphragms such that the undulating portion of the preform blank flattens out and conforms to surfaces E and F of the molding tool and the non-undulating or flat portion of the preform blank conforms to surface D of the molding tool.

2. The method of claim 1, wherein the inner curved surface E of the molding tool is concentric to the inner curved surface D and the curved surface E has a larger radius of curvature relative to that of curved surface D.

3. The method according to claim 1, further comprising (f) applying pressure intensifiers over the preform to press the preform into the corners of the molding tool's cavity, wherein the pressure intensifiers have a triangular cross-section and are configured to mate with the corners inside the molding tool's cavity.

4. The method according to claim 1, wherein the fiber-containing material is a composite material comprising reinforcement fibers impregnated with a thermoset composition comprising one or more thermoset resin(s) or a thermoplastic material comprising one or more thermoplastic polymer(s).

5. The method according to claim 1, wherein the fiber-containing material is comprised mostly of fibers, is porous and is permeable to liquid.

6. The method according to claim 1,
wherein the preform blank is formed by an automated placement process in which a plurality of elongated or continuous tapes of fiber-containing material are deposited side-by-side on a tool surface to form a first layer, and subsequent layers are sequentially formed on the first layer in the same manner, and
wherein the tool surface contains undulations that correspond to the undulations in the preform blank.

7. The method of claim 6, wherein the tapes comprise fibers impregnated with a thermosetting resin or a thermoplastic material.

8. The method of claim 6, wherein the tapes comprise mostly of fibers, are porous and permeable to liquid.

9. The method according to claim 1, wherein the preform blank comprises multiple layers of composite material in a stacking arrangement, each layer of composite material comprising unidirectional fibers embedded in a thermosetting resin or a thermoplastic material, and wherein the unidirectional fibers in each layer are oriented at a different direction relative to the adjacent layer(s).

* * * * *